Patented May 16, 1939

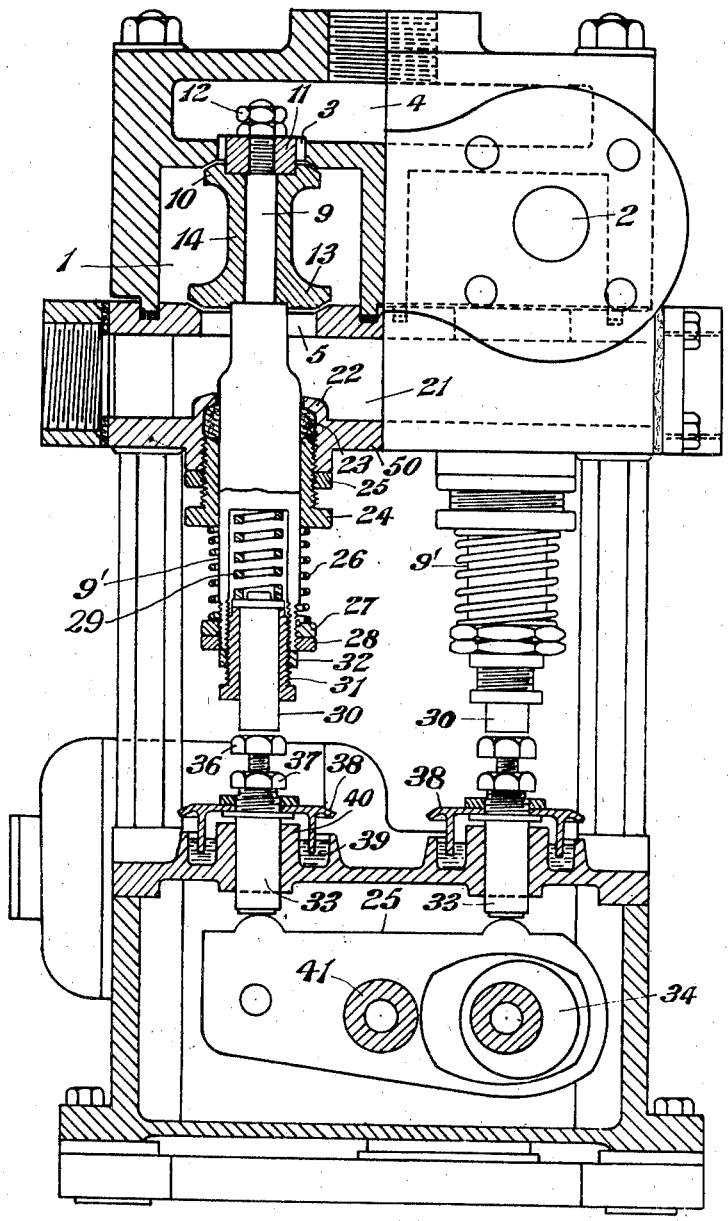

2,158,898

UNITED STATES PATENT OFFICE 2,158,898

CONTROL VALVE FOR LIQUID ELEVATING APPARATUS

William Herbert Exley, Market Harborough, and Walter Haddon, Forest Hill, London, England Application October 12, 1936, Serial No. 105,347
In Great Britain October 15, 1935

2 Claims. (Cl. 251—132)

This invention relates to control valves of apparatus for elevating liquids particularly corrosive and/or erosive liquids, where the temperature may be comparatively high, and where superheated steam may be the operating medium, the liquid being for example creosote oil or the like coke oven plant by-products, or mixed acids.

The apparatus is of the kind in which a pair of containers having inlet and outlet openings for the liquid are both connected to a valve arrangement for connecting each container in turn to a source of gas under pressure and atmosphere, to allow the container to discharge its contents and refill with liquid as in our prior United States Patent No. 2,047,319.

The present invention comprises a control valve for liquid elevating apparatus of the type specified, wherein the functioning of the valve is facilitated by providing the valve with a resilient mounting within the valve spindle or within an extension of such spindle.

In the preferred construction the resiliency is obtained by housing within a tubular portion of each valve spindle a spring arranged to operate on the valve operating mechanism.

Each plunger is made of two coaxial portions the lower portion in contact with a cam operated lever has on its upper end a length adjusting screw, and this screw is used for adjusting a gap between the operating plunger and the valve plunger of each valve. This arrangement permits adjustment to ensure that when one valve is in the up position there will be a gap between the one down and its operating plunger, and it is only in the cam free and transit positions that this gap is closed, and the two valves are then balanced on the cam lever through the springs.

Each double valve is formed with a valve at each end of a sleeve fitting on the valve spindle. The upper valve which may be a compressed air or steam valve is held on the spindle by a screwed washer provided with a tightening nut screwed on a reduced end of the spindle. This device also holds the lower valve against a shoulder provided on the valve spindle, or the double valve and the valve spindle may be made as one unit, that is to say, shaped from the same piece of material.

The portion of the valve spindle passing through the base of the exhaust passage, may be provided with a gland packing packed with suitable material such as what is known under the registered trade-mark "Supeta" asbestos packing.

A valve constructed in accordance with the invention is shown in the accompanying drawing, to which attention is now directed.

The body of the apparatus containing the valves and passages may be made of lead or an alloy of lead, and when subjected to acid spray is so made.

The body portion of the apparatus preferably comprises an upper portion 55 containing the inlet valve body, and a lower portion 50 containing the exhaust.

The double faced valve 10, 13 is preferably made of lead or an alloy of lead with a mild steel strengthening core 9, and an extension 9'.

The lower portion of the valve spindle is protected from acid spray by the stuffing gland 24 and may be made of any suitable material such as aluminium bronze, or the like.

In the apparatus there are two similar valve chambers each communicating with the containers. Valves 10 and 13 operate in the chambers between inlet and outlet ports 3, 5. These valves are oscillated in opposite directions by the lever 25 moving about a fulcrum 41 so that one of the containers is filled whilst the other is being emptied. The channel 4 common to both valve chambers 1 communicates with the source of gas under pressure and the similar channel 21 communicates with the atmosphere. The valve chambers are connected to the container through passages 2.

The top and bottom members 10, 13 of the valve 14 are oscillated between inlet and outlet ports 3 and 5 by means of a cam 34 and lever 25 which operates the adjustable plunger 33.

Each double valve 14 is preferably formed as one unit fitting on the valve spindle 9. The face of the upper valve opens and closes the compressed air, steam or other gas inlet port 3, whilst the lower valve face opens and closes the exhaust port.

The whole unit is held on to the valve spindle 9 by a screwed nut 11, which is fluted or shaped to fit the inlet port, and acts as a guide for the valve and at the same time permits passage of the air or other operating medium when the inlet valve is open. The nut 12 is a locking nut to still further secure the valve in position. It will be understood that the double valve 10, 13 the fluted nut 11, and the sleeve 14 of the double valve, may be made as one unit shaped from the same piece of material.

The portion of each valve spindle passing through the base of the exhaust passage 21 is provided with a stuffing box 22 packed with suitable material 23, such as asbestos held in position by the gland 24 screwed into the base of the exhaust casting and secured by a lock nut 25. Bearing on the outer face of this gland 24 is a spiral compression spring 26 to assist the downward movement of the valve against the resistance of the stuffing box, and the other end of this spring 26 bears against a nut 27 screwed on the outside of the tubular extension 9' of the valve 10, 13, which nut 27 provides means for adjusting the compression of the spring 26, after which the nut 27 is locked by the lock nut 28.

The resiliency necessary for the functioning of the valves is obtained by housing centrally in the valve spindle 9' a compression spring 29 which operates upon the shouldered portion of a coaxial cylindrical plunger 30, which is free to move in a vertical direction within a screwed gland 31, which screws into the tubular portion of the valve spindle and provides means for adjusting the compression of the spring 29, after which the gland 31 is locked by the nut 32.

The free end of vertically movable plunger 30 engages with the corresponding vertically movable plunger 33, operated by the cam 34 and lever 25 which latter plunger is provided with a length adjusting screw 36 and lock nut 37, and where corrosive atmospheric conditions prevail, an inverted cup shaped shield 38, the edges of which extend into a well 39, surrounding the bearing 40 of the plunger 38, which well contains oil or other suitable liquid which acts as a practically frictionless seal to prevent corrosion of the plungers.

It will be understood that as in our prior United States Patent No. 2,047,319, the area of the inlet port 3 and its valve is less than the area of the exhaust port 5 and its valve, also in the midway operating positions of the cam and cam lever, the latter is free of the cam and the valves are balanced on the cam lever 35 and held in position by virtue of the pressure acting on the differential area of the inlet and exhaust valves, and remain so held until further movement of the cam 34 acting through the cam lever 25 disturbs the balance, after which the transition is rapid, with consequent negligible loss of air or other operating medium during the transition period, and furthermore, again by virtue of the differential feature aforesaid, the power required to operate the valve is at a minimum even when comparatively high pressures are used and comparatively large valves are used.

In actual practice the central springs are adjusted as afore-described, so that when further compressed by the operated cam lever they are sufficiently strong to maintain the inlet valve closed against the operating pressure, with a margin to allow for an adjusting gap between the plungers 33 and 30, so that when the valves are in the balanced position prior to transit the inlet valve 19 is still maintained closed, and remains so until the balance is disturbed by the operating mechanism. It will be noted that the springs 29 act in a differential sense when the valves are balanced on the cam lever 25.

We claim:

1. In a liquid elevating apparatus of the kind specified, a resiliently mounted valve, a hollow valve spindle carrying the valve at one end thereof, an adjustable spiral spring arranged within the end of the valve spindle remote from the valve to impart resiliency thereto, a stuffing box containing packing, and through which the valve spindle passes, a second adjustable spiral spring arranged outside the valve spindle on the side of the stuffing box remote from the valve and forcing the valve spindle through the stuffing box containing the packing and through which the valve spindle passes, a valve operating plunger coaxial with the valve spindle and engaging the resilient valve spring, the said plunger containing two relatively separable coaxial portions and means to vary the relative distance between said portions, and the lower portion containing a cup-shaped shield extending adjustably into an oil well.

2. In a liquid elevating apparatus of the kind specified, a resiliently mounted valve, a hollow valve spindle carrying the valve at one end thereof, an adjustable spiral spring arranged within the end of the valve spindle remote from the valve to impart resiliency thereto, a stuffing box containing packing and through which the valve spindle passes, a second adjustable spiral spring arranged around said valve spindle and biasing the valve spindle towards valve opening position, a valve operating plunger coaxial with the valve spindle and engaging the first aforementioned resilient valve spring therein, and an inverted cup-shaped shield carried by said plunger and having its periphery adapted to extend into an annular oil recess for forming a seal.

WILLIAM HERBERT EXLEY.
WALTER HADDON.